Sept. 18, 1962   F. K. H. NALLINGER   3,054,609
SPRING SYSTEM FOR SEATS, PARTICULARLY MOTOR VEHICLE SEATS
Filed Oct. 6, 1959   3 Sheets-Sheet 1
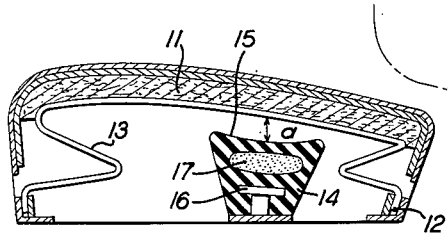
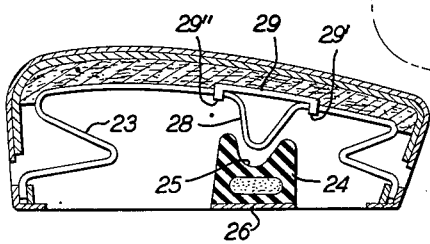
INVENTOR
FRIEDRICH K. H. NALLINGER
BY *Dicks, Craig & Freudenberg*
ATTORNEYS.

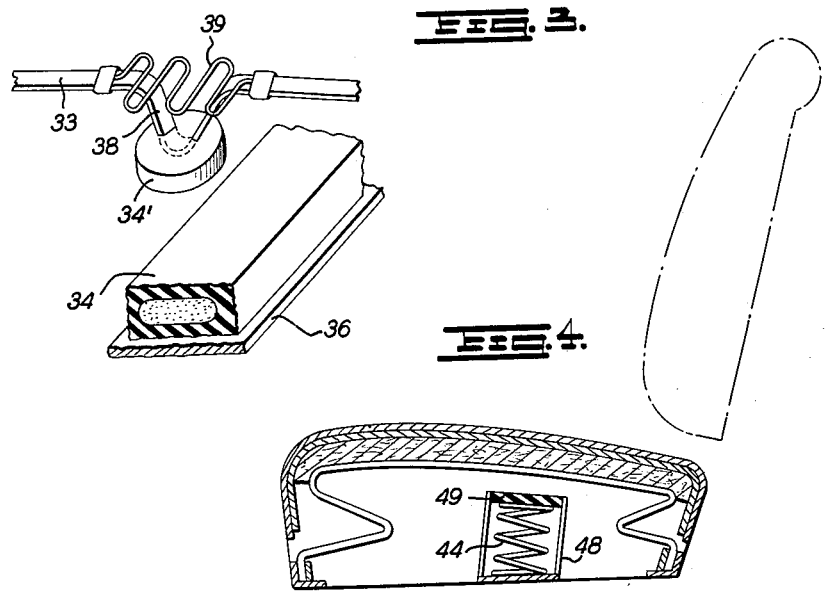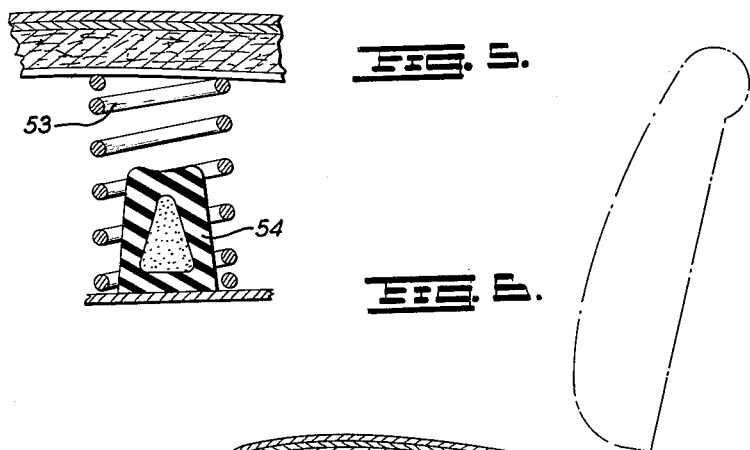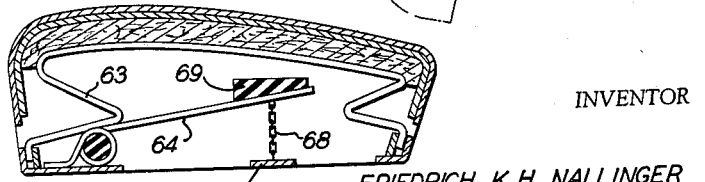

Sept. 18, 1962  F. K. H. NALLINGER  3,054,609
SPRING SYSTEM FOR SEATS, PARTICULARLY MOTOR VEHICLE SEATS
Filed Oct. 6, 1959  3 Sheets-Sheet 3
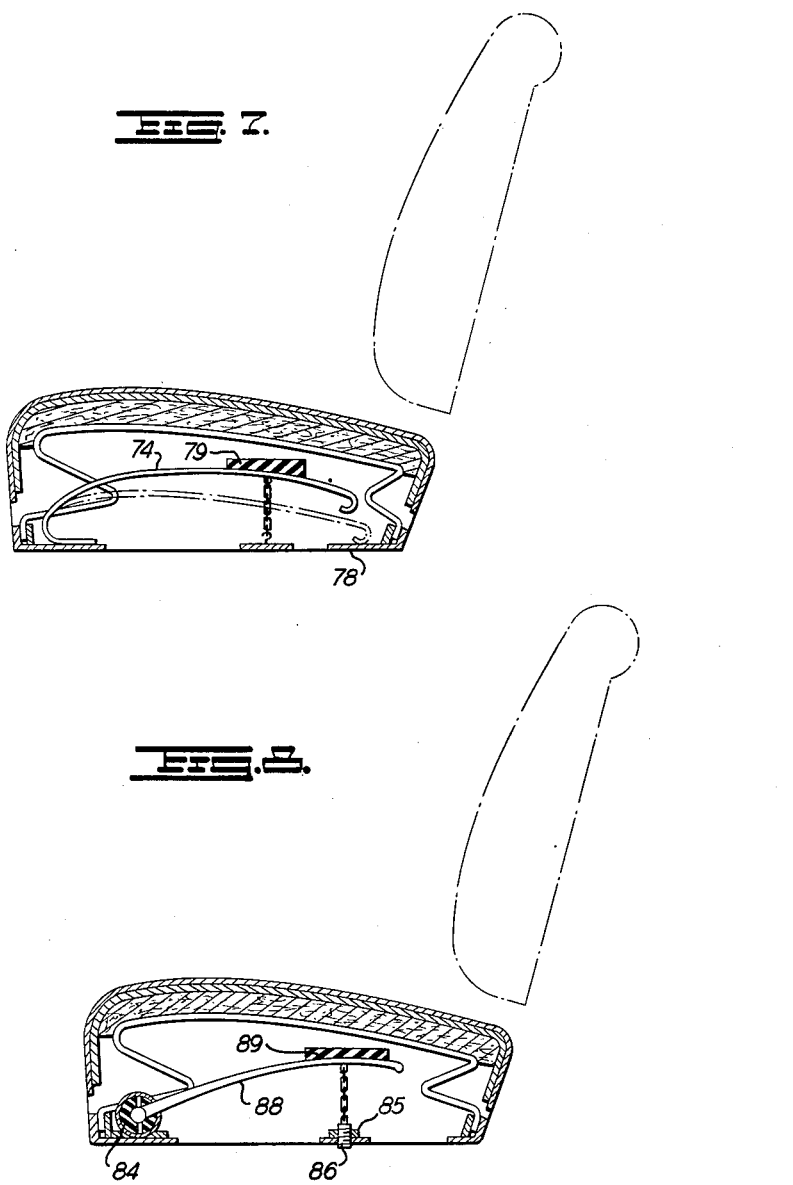
INVENTOR
FRIEDRICH K. H. NALLINGER
BY
ATTORNEYS.

United States Patent Office 3,054,609
Patented Sept. 18, 1962

3,054,609
SPRING SYSTEM FOR SEATS, PARTICULARLY MOTOR VEHICLE SEATS
Friedrich K. H. Nallinger, Stuttgart, Germany, assignor to Daimler-Benz Aktiengesellschaft, Stuttgart-Unterturkheim, Germany
Filed Oct. 6, 1959, Ser. No. 844,746
Claims priority, application Germany Oct. 18, 1958
4 Claims. (Cl. 267—85)

The present invention relates to a spring system for seats, particularly for motor vehicles, consisting of spring elements which resiliently support the seat cushion on the seat frame.

It is desirable that in particular the spring system for vehicle seats, even under variable loads, always offers equally good spring characteristics and is able to conform, to a considerable degree, to the body contour of the person seated thereon. This means that the spring system, on the one hand, has to be relatively soft and locally resilient in order to offer, above all, sufficient resiliency for persons of small weight. On the other hand, the spring system has to be sufficiently resistant against deflection in order to accommodate also safely persons of greater weight without causing excessive spring deflections, particularly at the rear portion of the seat cushion, and to prevent thereby hitting the floor during relatively strong vibrations or shocks of the vehicle that may occur during travel.

In order to enable absorption of a heavy load by the seat cushion, it is known already in the prior art to reinforce the seat springs locally by means of auxiliary springs. This measure may well have some advantages with relatively heavy persons; however, for persons of normal weight or particularly for those of relatively smaller weight, such type of combined spring system becomes too hard.

The present invention is concerned with the task and problem of producing a spring system which satisfies all of the aforementioned requirements.

As a solution to this problem, the present invention proposes to provide one or more additional elastically yielding structural elements within the region of the seat cushion or seating surface subjected to the largest load, which additional elements become effective only after the deflection of the spring elements, properly speaking, beyond a predetermined, possibly adjustable spring deflection.

According to a further feature of the basic idea in accordance with the present invention, it is proposed to construct and/or arrange the elastically yielding structural element or elements in such a way that the upper abutment surface thereof is disposed at such a distance below the underside of the seat cushion that only in the presence of a relatively large load on the seat, that is, a load larger than the normal weight of a person, the aforementioned additional structural elements become effective, i.e., an abutment of the underside of the seat cushion against the upper abutment surface of the additional structural elements takes place.

The advantages derived from the present invention are as follows:

For persons with relatively small or normal weight, the spring system according to the present invention continues to provide a soft, elastic support which absorbs light or small road shocks almost unnoticeably because, in such cases, the additional or auxiliary spring system becomes effective only rarely and if so, only in the initial phase thereof. If, on the other hand, severe road shocks occur, these severe road shocks will still be absorbed elastically because the additional, springily yielding structural elements prevent, under any circumstance, a disadvantageous hard spring deflection of the seat cushion when the latter would ordinarily exceed the normal path of the total spring deflection only to produce an impact-like abutment against the frame, floor or the like.

Moreover, the inventive auxiliary spring system of the present invention may also be adjusted depending on the weight of the passenger to be seated thereon and on the condition of the road, and in particular in such a manner that the point at which the additional spring system becomes effective may be readily determined or adjusted. Consequently, the present invention offers to relatively heavy persons the possibility of maintaining a minimum seat height and therewith also a minimum spring deflection which is not only of advantage from the point of view of actual construction of the springs but also contributes to the driving safety by an increase in the visibility conditions.

If the leaf or coil springs are used as the seat springs, properly speaking, which are provided with a V-shaped bent portion in the region of the heaviest load thereof, it is further proposed in accordance with the present invention to bridge this bent portion by means of a connecting strap or cover plate in order to prevent, on the one hand, a deflection or shifting of the bent portion when it contacts or impinges on the additional, auxiliary spring and, on the other hand, to avoid a gradual sinking in or denting of the cushion within the region of this bent portion.

Accordingly, it is an object of the present invention to provide a seat, particularly for motor vehicles, the springiness or resiliency of which remains essentially the same under considerably varying loads.

It is another object of the present invention to provide a seat for motor vehicles which is designed to seat thereon in a comfortable manner any passenger regardless of weight and which is adapted to conform readily to the contour of the occupant's body.

Still another object of the present invention resides in the provision of a seat for motor vehicles in which the seat springs are prevented from deflecting excessively to thereby avoid hitting the floor when shocks occur during vehicle travel, even though the seat is occupied by a heavier than normal person.

A still further object of the present invention resides in the provision of a vehicle seat which is provided with a spring arrangement that assures a soft elastic support for occupants with normal and less than normal weight and which absorbs light vehicle shocks almost unnoticeably, whereas hard shocks are absorbed by an auxiliary spring arrangement that becomes effective only after a predetermined deflection of the regular seat springs.

A further object of the present invention is to provide a seat for motor vehicles in which the point of effectiveness of the auxiliary spring may be selectively adjusted.

An additional object of the present invention resides in the provision of a seat for motor vehicles which assures always a minimum height even when accommodating abnormally heavy persons, thereby assuring good visibility for any driver irrespective of weight and therewith increase the driving safety.

These and other objects, features and advantages of the present invention will become more obvious from the following description when taken in connection with the accompanying drawing, which shows, for purposes of illustration only, several embodiments in accordance with the present invention, and wherein:

FIGURE 1 is a longitudinal cross-sectional view through a first embodiment of a vehicle seat including an auxiliary spring system according to the present invention, FIGURE 2 is a longitudinal cross-sectional view, similar to FIGURE 1, through a modified embodiment of a vehicle seat, according to the present invention, FIGURE 3 is a partial perspective view of a modified construction of an auxiliary spring system different from that of FIGURES 1 and 2, FIGURE 4 is a longitudinal cross-sectional view of a further modified embodiment of a vehicle seat provided with an auxiliary spring system according to the present invention, FIGURE 5 is a partial cross sectional view of still another embodiment of a vehicle seat with a spring system according to the present invention, FIGURE 6 is a cross sectional view of a further modified embodiment of a spring system for a vehicle seat according to the present invention, and FIGURES 7 and 8 are cross sectional views of two further modified embodiments of a spring system for a vehicle seat according to the present invention.

Referring now to the drawings, wherein like reference numerals are used throughout the various views to designate like parts, and more particularly to FIGURE 1, reference numeral 11 designates therein the seat cushion of the illustrated vehicle seat which is supported with respect to the seat frame 12 by means of coil or preferably leaf springs 13 or any other suitable known springs. The additional or auxiliary springily yielding structural elements used in the embodiment of FIGURE 1 are in the form of rubber bodies 14. The rubber bodies 14 are arranged or disposed within the region of the largest load on the seat cushion in such a manner that the upwardly facing stop or abutment surface 15 thereof is at a distance $a$ below the individual leaf springs 13. The distance $a$ may correspond to the maximum spring deflection of the leaf springs 13 which occurs under normal static load. The rubber bodies 14 may, for instance, be mounted or placed over suitably shaped support elements 16, for instance, on T-shaped support elements 16. Cavities 17 may be provided within the rubber bodies 14 which may be filled with air or cellular material such as foam rubber.

The seat illustrated in FIGURE 2 is again supported by means of suitable springs such as coil or preferably leaf springs 23 which are provided within the region of the expected heaviest load of the seat with a V-shaped bent portion 28 which, in turn, is bridged by means of a connecting strap or cover plate 29 adjustably secured to the coil spring 23 at points 29' and 29" thereof. The elastically yielding structural element 24 may be connected, for instance, permanently to the support element 26 thereof. The upper abutment surface 25 of the structural element 24 conforms to the shape of the V-bent portion 28 of the respective spring 23.

In FIGURE 3, additional elastic structural elements 34' and 34 are provided both at the V-shaped bent portion 38 of the leaf spring 33 and at the seat floor 36 respectively. The structural element 34' thereby extends over several leaf springs 33 in the transverse direction whereby the springs 33 extend in the longitudinal direction. An arrangement of the elastic structural element extending over several springs may also be used in connection with any of the other two aforementioned embodiments as to the structural elements 14 and 24 thereof. In the embodiment according to FIGURE 3, a zig-zag shaped spring 39 may serve for bridging the free space of the V-shaped bent portion 28.

According to FIGURE 4, coil springs 44 are employed as the auxiliary structural elements which may be maintained under initial tension by means of a casing 48. The top of the casing 48 is provided with an elastic cover or abutment 49.

In FIGURE 5 the main seat-springs consist of helical coil springs 53. Rubber springs 54 are arranged within the coil springs 53, which may be filled with air, gas or foam-like material.

FIGURE 6 illustrates a seat with leaf springs 63 and additional spring elements having the form of hairpin springs 64 which may be pretensioned by any suitable known means, for instance, by means of chain links 68 adapted to be hooked to the seat floor 66 at various lengths thereof, whereby the magnitude of the pretension is adjustable. The individual hairpin springs 64 are connected together by means of a common abutment plate 69.

In FIGURE 7, the auxiliary spring system essentially consists of leaf springs 74 which are also under initial tension or prestressed. As will be quite apparent from FIGURE 7, the initial spring action of leaf spring 74 is very soft; for the outer end of the leaf spring 74 comes into contact with a stationary or rigid stop member 78, for instance, with the seat floor 78 only after a predetermined spring deflection thereof so that the spring characteristic begins to rise steeper at this point, i.e., the spring characteristic becomes harder or stiffer. This is of importance for the very reason that even the largest or heaviest shocks are still elastically absorbed thereby. The individual leaf springs 74 may again be connected with each other by means of a common stop plate or connecting strap 79 of elastic material.

In FIGURE 8, a rubber torsion spring 84 serves as the additional or auxiliary spring element which becomes effective by way of a lever arm 88 which extends into the region of the greatest load on the seat and is provided thereat with an abutment plate 89. The adjustment of the desired initial tension of the rubber torsion spring 84 may be accomplished, for instance, by a screw bolt 86 guided in a stationary nut 85.

While I have shown and described several preferred embodiments of a spring suspension for seat cushions in accordance with the present invention, it is understood that the same is not limited thereto but is susceptible of many changes and modifications within the spirit and scope of the present invention, and I, therefore, do not wish to be limited to the specific details described and shown herein but intend to cover all such changes and modifications as are encompassed by the scope of the appended claims.

I claim:

1. A spring system for seat cushions, particularly of motor vehicles comprising a seat frame, main spring means for resiliently supporting said seat cushion on said frame and including leaf spring means having a depending essentially V-shaped bent portion substantially within the region of the normally expected greatest load upon the seat, the apex of said V-shaped bent portion pointing essentially downwardly, and auxiliary spring means positioned essentially within the region of the normally expected greatest load and becoming effective only upon deflection of said main spring means by a predetermined amount, said auxiliary spring means including at least one block-like elastic structural element provided with an upper abutment surface, said upper abutment surface being provided with a recess corresponding in configuration to said V-shaped bent portion and adapted to receive the same therein when said auxiliary spring means become effective, and bridging means for connecting leg portions of said V-shaped bent portion with each other.

2. A spring system for seat cushions according to claim 1, wherein said bridging means includes at least one plate-like member, and wherein said bridging means are adjustably connected at least at one end thereof.

3. A spring system for seat cushions, particularly of motor vehicles, comprising a seat frame, main spring means including leaf spring means for resiliently supporting said seat cushion on said frame, and auxiliary spring means arranged essentially within the region of the normally expected greatest load and becoming effective only upon deflection of said main spring means by a predetermined amount, said leaf spring means having an essentially V-shaped bent portion substantially within the region of the normally expected greatest load, the apex of said V-shaped bent portion pointing essentially into the seat, said auxiliary spring means including an elastic structural element consisting primarily of a rubber-like material, said elastic structural element being located below the underside of said seat cushion at such a distance therefrom that said auxiliary spring means become effective only upon the application of a relatively heavy load to the seat, said elastic structural element being provided with an upper abutment surface corresponding in configuration to said V-shaped bent portion and adapted to receive the same when said auxiliary spring means is rendered effective.

4. A spring system according to claim 3, wherein said elastic structural element is provided with recess means filled with a cellular material of different elasticity than the remainder of said elastic structural element.

References Cited in the file of this patent

UNITED STATES PATENTS

| | | |
|---|---|---|
| 1,928,155 | Kletsky | Sept. 26, 1933 |
| 2,049,551 | Van Dresser | Aug. 4, 1936 |
| 2,193,743 | Sargent | Mar. 12, 1940 |
| 2,459,755 | Flint | Jan. 18, 1949 |
| 2,537,640 | Flint | Jan. 9, 1951 |
| 2,966,207 | Burgert | Dec. 27, 1960 |

FOREIGN PATENTS

| | | |
|---|---|---|
| 13,849 | Great Britain | 1912 |
| 937,144 | Germany | Dec. 29, 1955 |